United States Patent [19]

Evans et al.

[11] Patent Number: 4,755,023
[45] Date of Patent: Jul. 5, 1988

[54] HEADGEAR MOUNTED DISPLAY VISOR

[75] Inventors: Charles D. Evans, Palo Alto; Andrew T. Tirums, Santa Clara; Eric W. Larkin, Union City, all of Calif.

[73] Assignee: Kaiser Aerospace and Electronics Corporation, Oakland, Calif.

[21] Appl. No.: 923,285

[22] Filed: Oct. 27, 1986

[51] Int. Cl.[4] .................. G02B 27/14; G02B 5/10
[52] U.S. Cl. ........................... 350/174; 350/601; 350/629
[58] Field of Search ............... 350/174, 601, 629

[56] References Cited

U.S. PATENT DOCUMENTS

| | | | |
|---|---|---|---|
| 2,961,926 | 11/1960 | Hoffmeister | 350/629 |
| 3,059,519 | 10/1962 | Stanton | 88/1 |
| 3,787,109 | 1/1974 | Vizenor | 350/301 |
| 3,870,405 | 6/1975 | Hedges | 350/294 |
| 3,923,370 | 12/1975 | Mostrom | 350/55 |
| 4,026,641 | 5/1977 | Bosserman et al. | 350/298 |
| 4,081,209 | 3/1978 | Heller et al. | 350/174 |
| 4,153,913 | 5/1979 | Swift | 358/93 |
| 4,264,144 | 4/1981 | McCord | 350/629 |
| 4,361,384 | 11/1982 | Bosserman | 350/174 |
| 4,465,347 | 8/1984 | Task et al. | 350/538 |
| 4,508,424 | 4/1985 | Ruder | 350/174 |

OTHER PUBLICATIONS

Scientific American, Dec. 1980, pp. 206–228, "Mirror Images" by D. E. Thomas.

Primary Examiner—John K. Corbin
Assistant Examiner—Ronald M. Kachmarik
Attorney, Agent, or Firm—Marvin H. Kleinberg; Matthew F. Jodziewicz

[57] ABSTRACT

A visor for mounting on a helmet adapted to be worn by an individual, includes a substantially transparent visor having an inner concave surface, and, with reference to an orthogonal, right-handed xyz Cartesian coordinate system of spatial reference having its origin located on the inner concave surface and its z-axis parallel to the line of sight of the individual wearing the helmet, the inner concave surface being defined by a cross-section of the visor in the x-axis of reference, which is symmetrical about both the origin and the y–z plane of reference, having one-half of the cross-section of the visor in the x-axis of reference being a first circular segment containing the origin at one end and connected to its opposite end to one end of a first paraboloid segment which is connected at its opposite end to one end of an elliptic segment whose opposite end forms a side boundary of the visor, and by a cross-section of the visor in the y-axis of reference having a second circular segment, one end of which forms an upper boundary of the visor and an opposite end connected to one end of a third circular segment having its opposite end connected to one end of a second paraboloid segment whose opposite end forms a lower boundary of the visor.

32 Claims, 4 Drawing Sheets

HEADGEAR MOUNTED DISPLAY VISOR

BACKGROUND OF THE INVENTION

1. Field of the Invention

The present invention relates in general to head mounted displays which produce images visible to the wearer of the display, and, more particularly, to a method for producing an improved visor or shield for use with a helmet mounted display that operates in conjunction with a partially reflective coating to superimpose the display on an exterior scene that is being viewed by the wearer, and to the improved visor itself produced by the method taught herein.

2. Description of the Related Art

Helmet mounted display apparatus finds utility in many areas, such as training, machine control or entertainment. In recent years, such devices have found particular utility in military applications where information must be supplied to vehicle operators and weapons controllers. Aircraft pilots find such devices useful to furnish information relating to aircraft operation, radar presentations, maps, weapons aiming and other things that would be useful or desirable in their mission.

The images, which are superimposed on a surface in the wearer's line of sight, can be derived from a variety of sources including cathode ray tubes (CRTs) that can be mounted in a helmet. Prior art devices have utilized fiber optics displays, flat screen liquid crystal devices with image enhancers, and even photographic projectors operating with an appropriate optical relay system, all of which might supply the wearer with an informational image.

Helmet mounted systems for displaying images are well known in the art. U.S. Pat. No. 3,059,519, to Stanton, taught a helmet mounted display in which a CRT display was directed through an optical system that included a plurality of reflecting mirrors which ultimately placed the image in the eyes of the observer, slightly above the normal line of sight. However, an alternative embodiment included a partially reflective mirror in combination with a parabolic reflector. Another alternative embodiment replaced one of the mirrors with a semi-reflective mirror so that the pilot's view would not be completely obstructed by the helmet and mirrors.

U.S. Pat. No. 3,787,109, to Vizenor, disclosed a display where the helmet was provided with a paraboloidal visor with a partially reflective coating on the inner surface as the primary optical element in transmitting the image from the generating device to the eye of the observer. Such an innovation eliminated the need for separate combiner screens or beam splitters near the eyes.

A more complex optical path that still utilized a visor was disclosed in U.S. Pat. No. 3,923,370, to Mostrom. In this patent, limited areas of the inner surface of the visor were coated to be partially or totally reflective. An image generating system mounted at the upper portion of the helmet projects an image to a first reflective area which is high on the visor. The image is relayed to a planar mirror mounted on the front of the helmet and from there to a second reflective area which is just above the normal line of sight of the observer. As a result, all of the reflective elements are deemed to be substantially out of the field of view of the helmet wearer.

A similar optical arrangement is also shown in U.S. Pat. No. 4,465,347, to Task et al. However, the image, which is observed in the disclosed system, is derived from a telescopic optical system which projects the image on the inner surface of the visor. The image is reflected to a planar mirror on the helmet and then to the visor again where it is directed into the eye of the viewer and appears to be a part of the exterior scene.

A substantially more complex helmet display system is disclosed in U.S. Pat. No. 4,361,384, to Bosserman. That device combines a thin film flat panel display and a wafer diode image intensifier tube. A plurality of semi-transparent optical elements direct the image from the flat panel display into the eye of the observer. The image intensifier, using some of the same optics, also directs an image into the eye where it can be surperimposed over the images received from the exterior scene. The wearer thus views the exterior scene through both the visor and the flat panel display images. The visor, for reflecting purposes, can be holographic, toric, aspherical or spheric.

A toric combination was disclosed in U.S. Pat. No. 4,026,641, to Bosserman et al. The toric reflector does not appear to be a part of a visor, but rather, appears to be adapted to be mounted on the helmet.

A rather straightforward, helmet mounted system is disclosed in U.S. Pat. No. 4,153,913, to Swift, which utilizes a cathode ray tube in combination with a semi-transparent combiner screen. The patent suggests that the combiner plate be worn as goggles or spectacles.

U.S. Pat. No. 4,081,209, to Heller et al., utilizes a more complex optical system in combination with a spherical, semi-reflective combiner surface which may be part of a visor. A prism transmits the image from the source and directs it to the combiner surface which returns the image to the eye of the observer. A refractive interface at an inclined plane with respect to the image source compensates for distortion of the image due to different optical path lengths of different rays.

As will be seen, most prior art helmet visors are surfaces of revolution, usually paraboloids which result in a rather bulky visor. Such a design was necessitated by the requirements of tooling for the molding or forming of such visors. A modification to the design of the prior art paraboloidal visor was described in U.S. Pat. No. 3,870,405, to Hedges, which provided for a visor whose inner and outer surfaces were sections of cofocal paraboloids of revolution. Because earlier paraboloidal visors were of substantially constant thickness, images reflected off of the inner and outer surfaces did not have the same focal point and would therefore result in "ghost" images. The Hedges improvement resulted in both images being collimated with no angular difference in the pointing direction, and, as a result, the images appeared to be superimposed on the exterior scene with no loss in sharpness or clarity to the viewer.

A problem with each of the prior art references noted above and presently available helmet mounted display devices, has been their size and bulk. Because the helmet member of the helmet mounted display system must be worn by an individual having many complex tasks to perform, usually under great stress and with little spare time in which to accomplish the tasks, the helmet member of the display system should be as light and compact as possible, while still providing superior optical performance. Specifically, bulky, large or heavy helmets cause their wearers to tire rapidly, thus shortening the effectiveness of the wearer. Similarly, poor images cause miscalculation as well as hinder the wearer's decision and reaction capabilities.

Accordingly, if a visor could be produced that was not simply a parabolic surface of revolution, the volume and size of the visor member of the helmet could be substantially reduced with a corresponding reduction in weight and bulk. Further, the visor should be capable of mass production with available equipment, therefore keeping the production costs under control. Finally, such a visor should provide for good optical performance in either the binocular or monocular mode. These are the problems of the present prior art devices that are solved by the present invention.

SUMMARY OF THE INVENTION

The present invention improves on the known prior art in that prior art visor design is limited, being based around a parabolic surface of revolution, and thus resulting in bulky shapes, not suitable for compact, head mounted display systems.

One of the objects of this invention, therefore, is to make possible a compact, head mounted display visor that provides good optical performance in either the binocular or monocular mode.

This invention is directed towards a visor which contains two, offset, image-forming parabolic segments (one opposite each eye location) optically blending into a visor surface which has a synthesized optical form with no axis of revolution as in conventional optics. The compactness of the visor is the result of this visor shape, which is not defined as a surface of revolution.

The injection molding tooling used in the manufacture of a visor in accordance with the disclosed and claimed invention can only be fabricated using state-of-the-art numerically controlled milling, grinding, and polishing tools. Conventional optics design and optics tooling is unusable for this new visor shape disclosed herein.

These and other objects are attained in a visor or shield to be mounted on a helmet that is adapted to be worn by an individual, comprising: a substantially transparent shield material having an inner concave surface. With reference to an orthogonal, right-handed xyz Cartesian coordinate system of spatial reference having its origin located on the inner concave surface and its z-axis parallel to the line of sight of the individual wearing the helmet, the inner concave surface is defined by a cross-section of the visor in the x-axis of reference, which is symmetrical about both the origin and the yz-plane of reference. One-half of the symmetrical cross-section of the visor in the x-axis of reference is a first circular segment containing the origin at one end and connected at its opposite end to one end of a first paraboloid segment which is connected, at its opposite end to one end of an elliptic segment whose opposite end forms a side boundary of the visor. A cross-section of the visor in the y-axis of reference has a second circular segment, one end of which forms an upper boundary of the visor and an opposite end is connected to one end of a third circular segment having its opposite end connected to one end of a second paraboloid segment whose opposite end forms a lower boundary of the visor.

The novel features of construction and operation of the invention will be more clearly apparent during the course of the following description, reference being had to the accompanying drawings wherein has been illustrated a preferred form of the device of the invention, and wherein like characters of reference designate like parts throughout the drawings.

DESCRIPTION OF THE PREFERRED EMBODIMENTS

Figure 1:
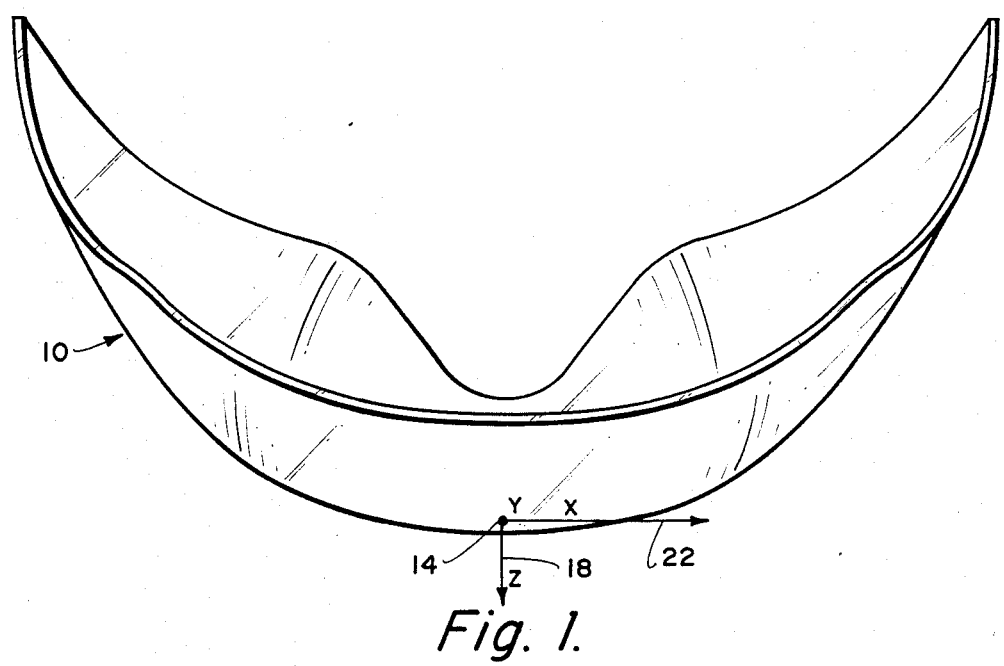
FIG. 1 is a top plan view of a visor embodying and constructed in accordance with the invention disclosed and claimed herein.

A helmet mounted display visor constructed in accordance with and embodying the present invention is made up of two decentered off-axis paraboloidal surfaces located on a visor surface, each approximately 1.5 inches in front of each eye of the helmet wearer. In order to minimize see-through distortions and to provide a pleasing visor shape, each paraboloidal surface is blended on all of its sides into a complex, but smoothly varying form as detailed herein. This form, although continuous and defined, has no simple closed form of mathematical expression, and therefore necessitates the following description in terms of bounded regions and segments.

Before continuing to describe the preferred embodiment of the visor below, it must be clearly understood that the only essential surfaces generated by the method for fabricating the visor and on the visor itself are the two decentered off-axis paraboloidal surfaces. The surface segments bounding these two paraboloidal surfaces can be any other curved surface that fits the goals of the overall visor design. Accordingly, while a method for generating a preferred visor and the preferred visor itself are described below as having certain explicit tangentially connected surface shapes, i.e., circular-parabolic-elliptical in the x–z plane of reference and circular-circular-parabolic in the y–z plane of reference, the surfaces forming tangentially connected boundary surfaces to the paraboloidal surfaces may be replaced by any other curved surface that fits the immediate goals of the individual designer.

FIGS. 1 through 4 illustrate the general appearance of a preferred visor constructed in accordance with the invention disclosed and claimed herein. Visor 10 is adapted to be mounted onto a helmet, not illustrated for simplicity, by any of the known mechanical means, so that the geometrical relationship between the wearer of the helmet and the visor is maintained substantially constant.

For reference purposes in simplifying the description and discussion of the invention, the invention and description will be described with regard to a standard orthogonal, right-handed xyz Cartesian coordinate system of spatial reference 12, having its origin 14 located on the inner concave surface 16 of the visor 10 and its z-axis 18 parallel to the line of sight of the helmet wearer. The y-axis 20 is vertical and the x-axis 22 is horizontal and to the left of an observer sighting along the z-axis 18. Accordingly, the x-z plane of reference defines the horizontal and the y-z plane of reference defines the left-right plane of human bilateral symmetry.

While this description is made in accordance with this described system of spatial reference, it must be noted that other systems of spatial reference, such as a polar coordinate system, are just as valid, and that the following mathematical description may similarly be made in those other reference systems by the use of a transformation function.

As the shape of a preferred visor constructed in accordance with the present invention is not defined as a surface of revolution, the following description of the preferred embodiment will describe the visor shape in its essential cross-sectional cuts in both the x-z and y-z planes of reference.

Figure 5:
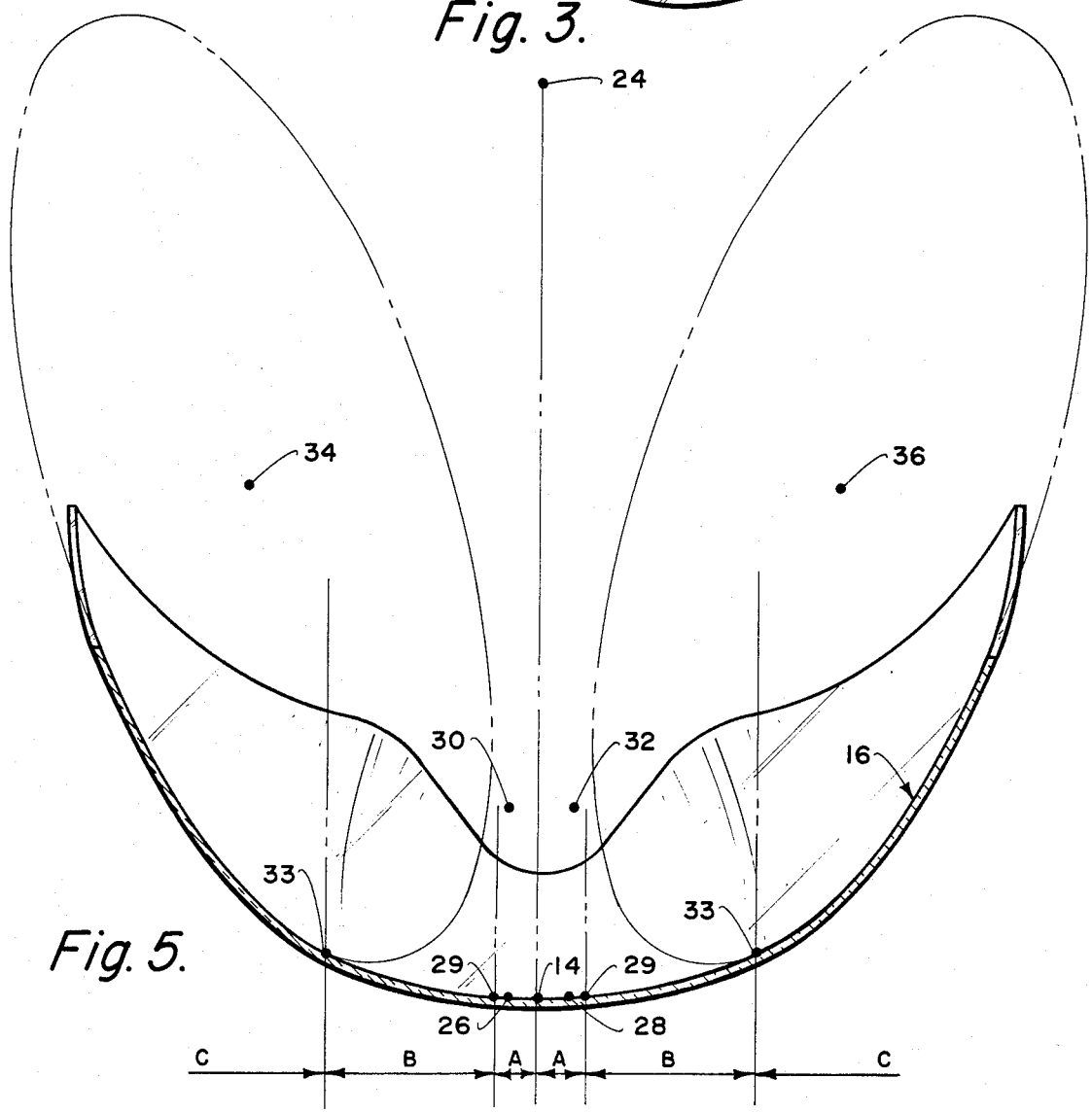
FIG. 5 is a view taken along the line 5—5 of FIG. 2 in the direction of the appended arrows.
Figure 4:
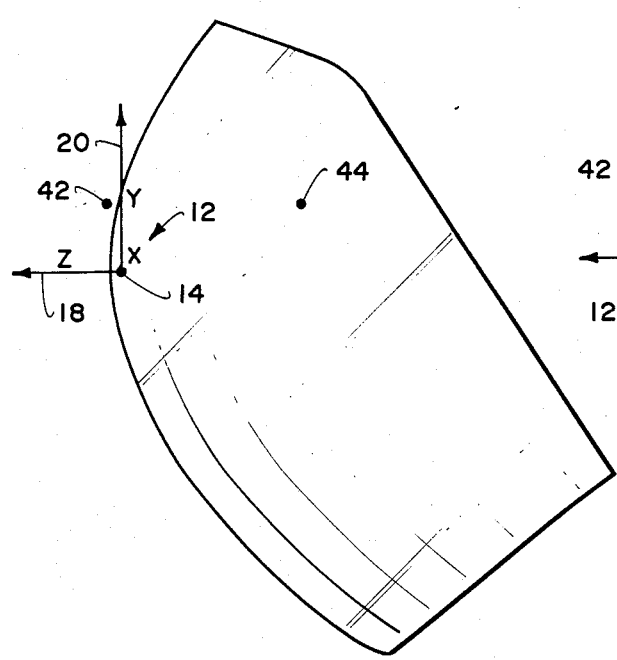
FIG. 4 is a side view of the visor of FIGS. 1 and 2.

FIG. 5 illustrates the first essential cross-sectional cut forming the visor in the horizontal or x-z plane of reference.

Regions A, B, and C are symmetric about the y-z plane of reference and the origin 14, and comprise arc segments of various geometric figures tangentially connected at their extrema.

Specifically, for variations along the x-axis 22 (assume y=0 for simplification purposes only), the inner concave surface 16 of the visor 10 in Region A is substantially in accordance with the relationship:

$$[z(x,0)+(c)]^2+(x)^2=(r)^2 \qquad \text{Eqn. 1}$$

which is a circular arc segment having its center at (x, 0, z(x,0)-c) and a radius of r, with c being a constant value.

In Region B, the surface of the visor is best described as being in substantial accordance with the relationship:

$$z(x,o) = -\frac{(x \mp a)^2}{4b} - c \qquad \text{Eqn. 2}$$

(where a, b, and c are constant values) which is a parabolic arc segment.

Finally, in Region C, the surface of the visor is substantially in accordance with the relationship: which is an elliptic arc segment.

$$z(x,o) = \qquad \text{Eqn. 3}$$

$$\frac{-(\pm Bx + E) + \sqrt{(\pm Bx + E)^2 - 4(c)(Ax^2 \pm Dx + F)}}{2(C)}$$

which is an elliptic arc segment.

Any horizontal or x-z plane cross-sectional cut through the visor 10 will conform to the above described composite curve, but shifted along the z-axis 18 of reference.

Figure 6:
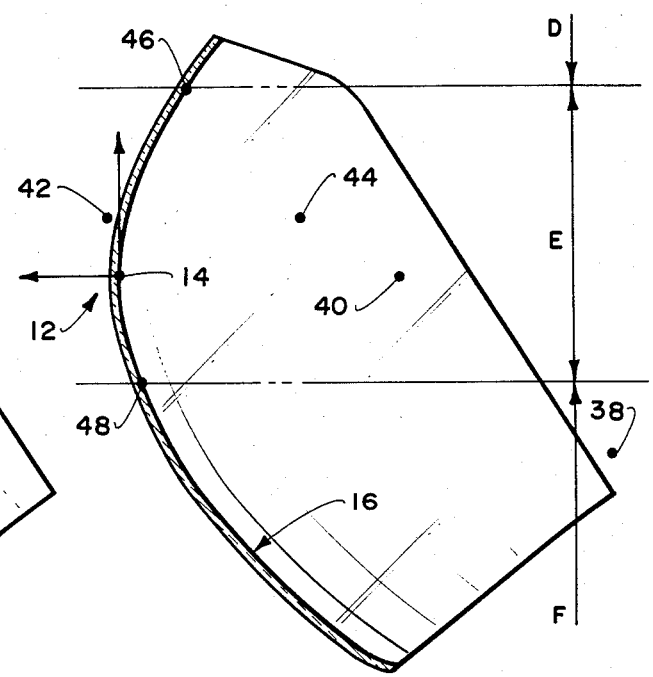
FIG. 6 is a view taken along the line 6—6 of FIG. 2 in the direction of the appended arrows.

FIG. 6 illustrates the second essential cross-sectional cut forming the visor in the vertical or y-z plane of reference.

Regions D, E, and F are symmetric about the x-z plane of reference, and comprise arc segments of various geometric figures tangentially connected at their extrema.

Specifically, for variations along the y-axis 20 (assume x=0 for simplification purposes only), the inner concave surface 16 of the visor 10 in Region D is substantially in accordance with the relationship:

$$[z(0,y)+(c)]^2+(y)^2=(r)^2 \qquad \text{Eqn. 4}$$

which is a circular arc segment having its center at (0, y, z(0,y)-c) and a radius of r, with c being a constant value.

In Region E, the surface of the visor is best described as being in substantial accordance with the relationship:

$$[z(0,y)+(c)]^2+(y)^2=(r)^2 \qquad \text{Eqn. 5}$$

which is another circular arc segment, having its center at: (0, y, z(0,y)-c and its radius equal to r.

Finally, in Region F, the surface of the visor is substantially in accordance with the relationship:

$$z(o,y) = -\frac{(y-A)^2}{4(B)} + C \qquad \text{Eqn. 6}$$

which is a parabolic arc segment.

Any vertical or y-z plane cross-sectional cut through the visor will conform to the above described composite curve, but shifted along the x-axis of reference.

An example of a preferred embodiment of a visor constructed in accordance with the present invention for a helmet wearer having a left eye location of:
x=32.376958702 y=−49.62262979 z(x,y)=−68.611847849 and a right eye location of:
x=−32.376958702 y=−49.62262979 z(x,y)=−68.611847849 would be substantially in accordance with the following relationships in each of the Regions discussed above.

The above generalized description of the visor 10 cross-sectional cut in the horizontal or x-z plane of reference, is best illustrated in FIG. 5, and has, in its preferred form, the following dimensions (in millimeters):

For Region A, defined for $0 \leq |x| \leq 11.720329103$ $$z(x,0)=\sqrt{(320.88080003)^2-(x)^2}-(320.88080003) \qquad \text{Eqn. 1A}$$

where the center 24 of the circle is at (x, 0, −320.88080003) and for the radius r, r=320.88080003.

Region A has a tangency point 29 to Region B at (x,y,z(x,y))=(±11.720329103, 0, ±.21411683138).

For Region B, defined for $11.720329103 \leq |x| \leq 56.928795878$ $$z(x,o) = -\frac{(x \mp 8.1925345917)}{(4)(48.26)} - (0.14964659663) \quad \text{Eqn. 2A}$$

where the vertex 26, 28 of the parabola is at: (x,0, z(x,0)) =(±8.1925345917, 0, −0.14964659663) and the focus 30, 32 of the parabola is at: (x, 0, z(x,0) =(±8.1925345917, 0, −48.40101).

Region B has a tangency point 33 at (x,y,z(x,y))=(±56.928795878, 0, +12.453952254).

For Region C, defined for |x|≧56.928795878, the following values are used in Equation 3:

A = 14,729.01761
B = 8,248.033634
C = 3,980.622389
D = −1,183,664.396
E = 403,214.7075
F = 29,201,474.86 where the ellipse center 34, 36 is at (x, 0, z(x,0))=(±76.575011396, 0, −129.98067588) and the ellipse tilt is equal to ±18.750838606 degrees, and the semi major/minor axes are equal to 127.0000 and 50.8000 respectively.

The above generalized description of the visor 10 cross-sectional cut in the vertical or y–z plane of reference, is best illustrated in FIG. 6, and has, in its preferred form, the following dimensions (in millimeters):

For Region D, defined for y≧44.920846709

$$z(0,y) = \sqrt{(139.7)^2 - (y+44.920846709)^2} - (123.3396255) \quad \text{Eqn. 4A}$$

where the center 38 of the circle is at (x, y, z(0,y))=(0, −44.920846709, −123.3396255) and for the radius r, r=139.7.

Region D has a tangency point 46 to Region E at (x,y,z(x,y))=(0, 44.920846709, −16.36037455).

For Region E, defined for −27.58643266≦y≦44.920846709

$$z(0,y) = \sqrt{(69.85)^2 - (y)^2} - (69.85) \quad \text{Eqn. 5A}$$

where the center 40 of the circle is at: (x, y, z(x,y))=(0, 0, −69.85) and the radius of the circle r, r=69.85.

Region E has a tangency point 48 to Region F at (x,y,z(x,y))=(0, −27.58643266, −5.678267649).

For Region F, defined for y −27.58643266

$$z(o,y) = -\frac{(Y - 13.906018656)^2}{(4)(48.26)} + (3.2402130619) \quad \text{Eqn. 6A}$$

where the vertex 42 of the parabola is at (x, y, z(x,y))=(0, 13.96018656, 3.2402130619) and the focus 44 of the parabola is at (x, y, z(x,y))=(0, 13.96018656, −45.01978694).

Figure 2:
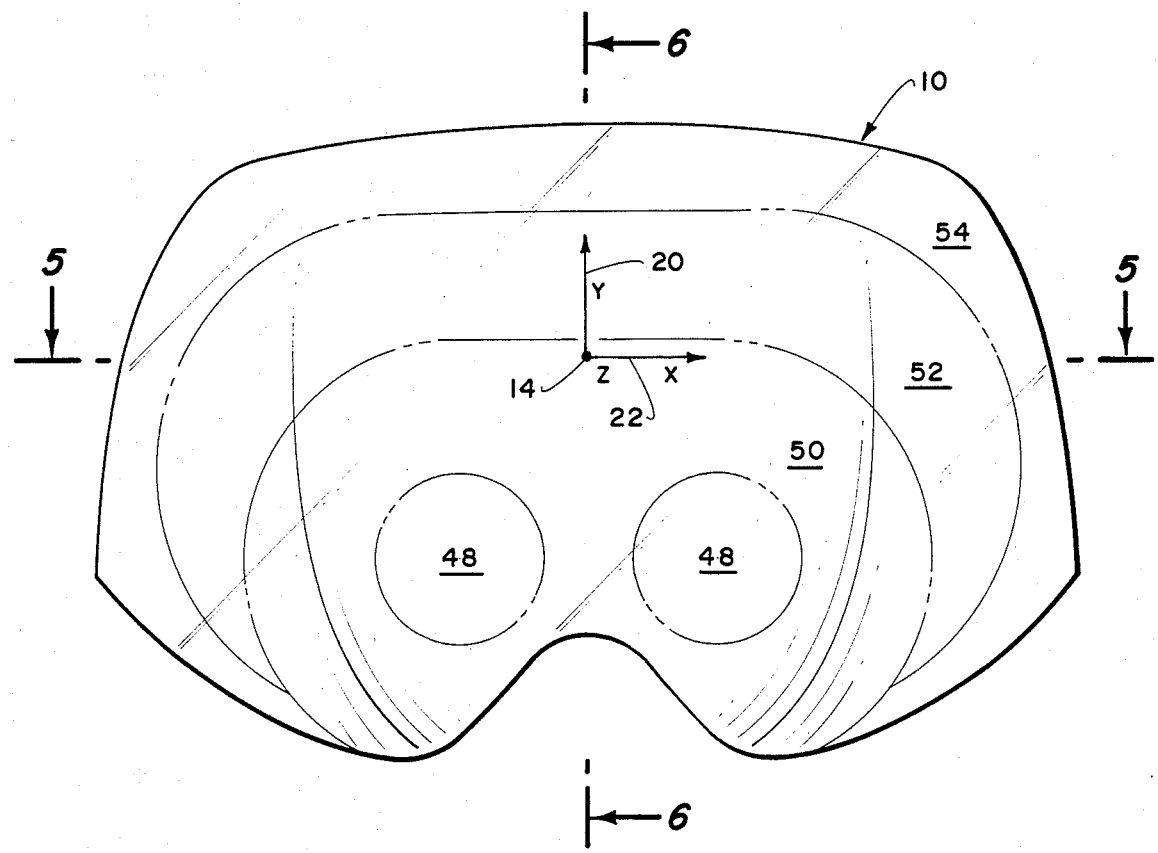
FIG. 2 is a front plan view of a visor embodying and constructed in accordance with the invention disclosed and claimed herein.
Figure 3:
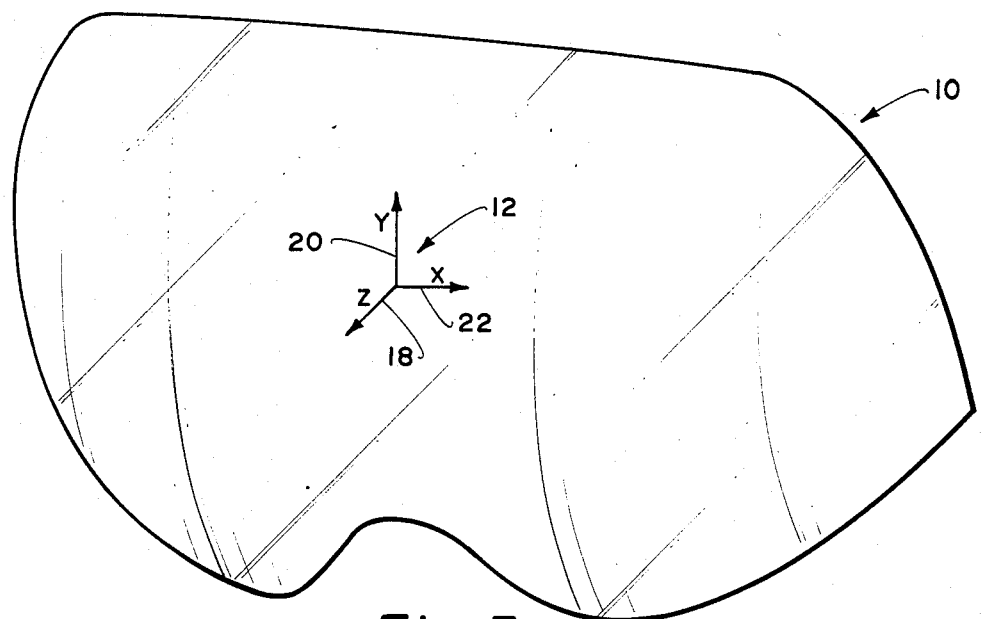
FIG. 3 is a side perspective view of the visor of FIGS. 1 and 2.

Part of the motivation in selecting the x and y boundary values noted above, was to accommodate variations in the right and left eye loci from that assumed above in the example, by providing a somewhat oversized parabolic region in the visor. With these chosen x and y boundary values, the visor 10, as illustrated in FIG. 2, will provide centralized optical surface areas 48 corresponding to the locus of each of the wearer's eyes, and a large critical area of vision area 50 to further accommodate the wearer. Finally, the non-critical area of vision 52 and the area outside of vision 54 are lessened by this choice of boundary values to produce a visor 10 well adapted to a wearer's vision requirements. Nevertheless, were the loci of the right and left eyes to vary significantly from the positions assumed above in the example, the generalized mathematical expressions established for each region would remain substantially unchanged, and only the constant values in the above example would have to be recalculated in accordance therewith.

While the visor device of the invention may be constructed of any transparent material which has an inner surface with significant reflectivity and has sufficient transmissivity to allow the visor to function as a "combining glass" within the limits of light source and ambient light intensities, a preferred reflective coating scheme will now be described.

Figure 7:
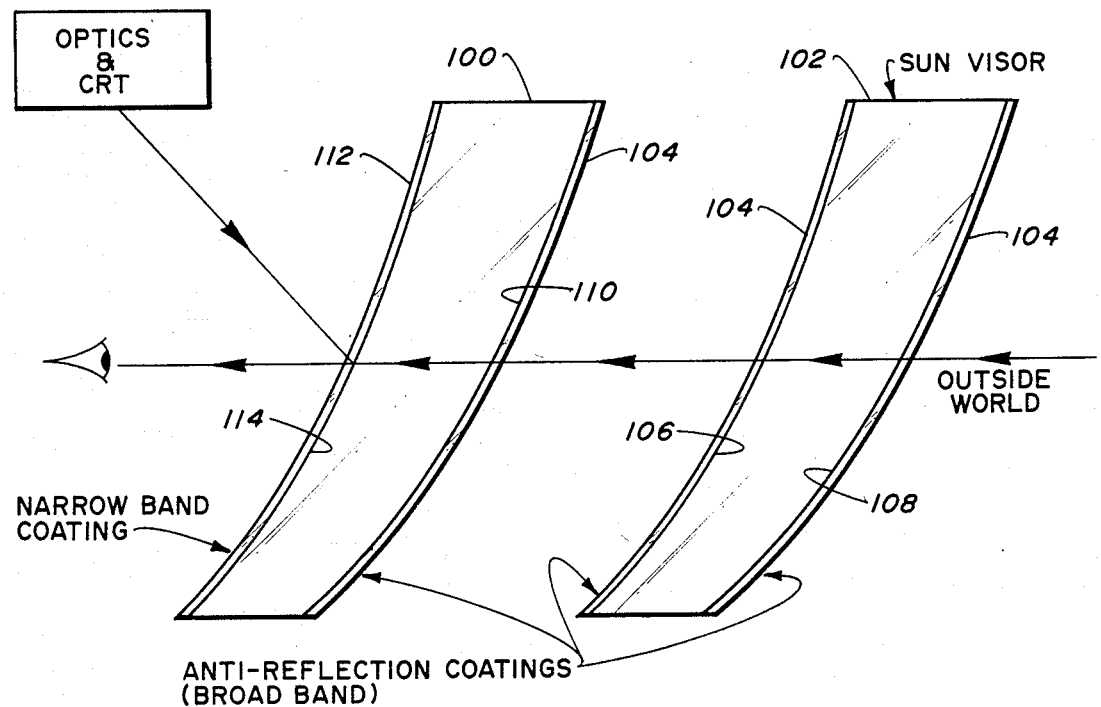
FIG. 7 is a view similar to FIG. 6 showing in cross-section how a sun visor and reflective coatings are associated with the visor of the invention.

With reference being made to FIG. 7, an optical visor 100 constructed in accordance with the invention herein, may be used either by itself or associated with a sun visor 102. Sun visor 102 may be mounted on the same helmet as visor 100 and may be manually added or removed as required or desired by the helmet wearer for such situations as night flight or sun glare.

Visor 100 is preferably constructed of a clear material such as an acrylic or polycarbonate plastic. Sun visor 102 may be constructed of a material similar to that of visor 100, but having a tint that provides a transmissivity of about 15 percent of ambient light.

Broad band anti-reflection coatings 104 are deposited on the inner and outer surfaces 106, 108 of sun visor 102 and on the outer surface 110 of visor 100.

Figure 8:
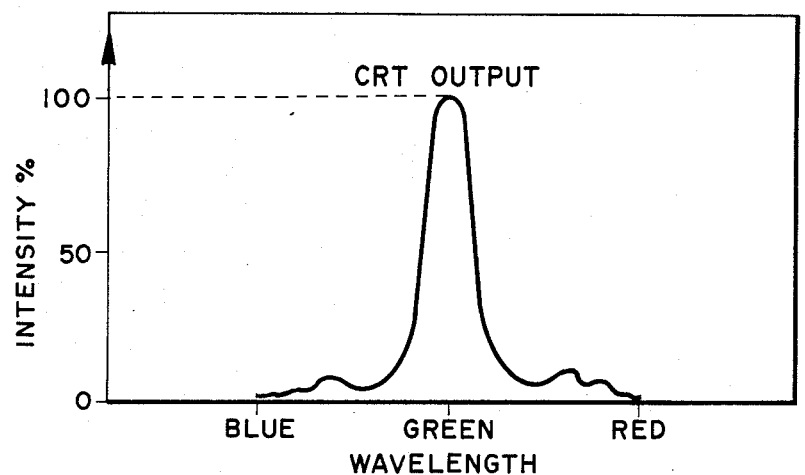
FIG. 8 illustrates the CRT/Optics systems output graphed as a function of intensity (in percent) to wavelength.
Figure 9:
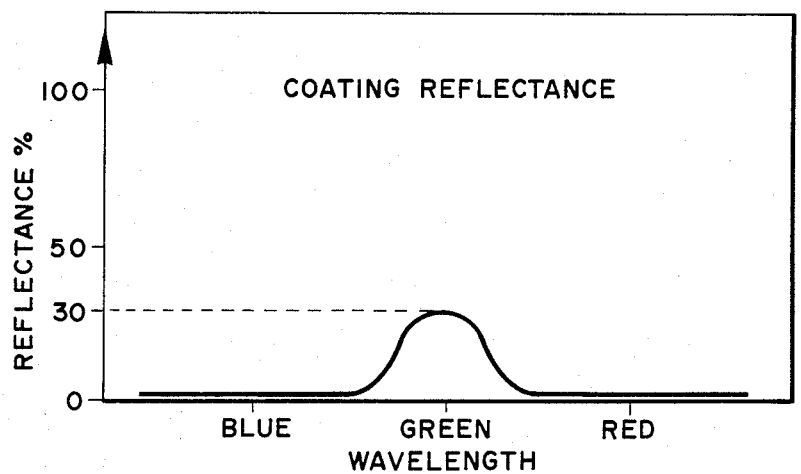
FIG. 9 illustrates the coating reflectance of an optical visor embodying the invention herein graphed as a function of reflectance (in percent) to wavelength.
Figure 10:
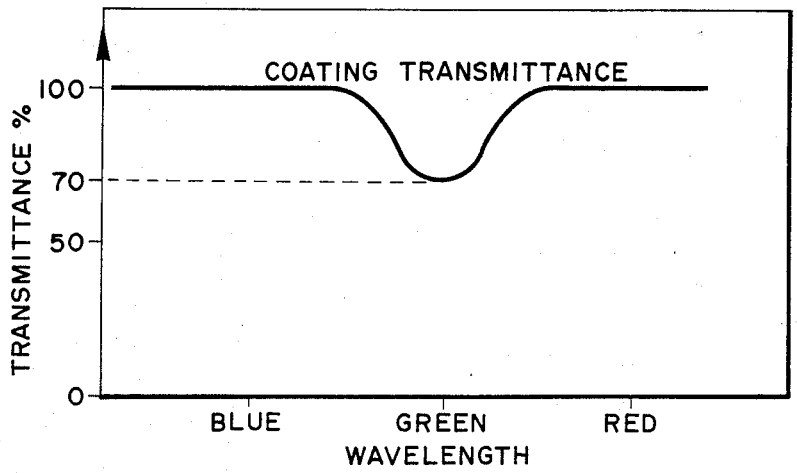
FIG. 10 illustrates the coating transmittance of an optical visor embodying the invention herein graphed as a function of transmittance (in percent) to wavelength.

A narrow-band reflective coating 112, that has about 30 percent reflectivity at the projection wavelength of the optics and CRT system employed with optical visor 100, is deposited on inner surface 114 of visor 100. Specifically, as best seen in the graphs illustrated in FIGS. 8, 9, and 10, optical or clear visor 100 has a tuned reflective coating 112 deposited on its inner surface 114 that is designed to maximize reflectance of the projected CRT/Optics system 116 phosphor color while at the same time minimizing color subtracted from the outside world.

Using this reflective coating scheme, the anti-reflective coatings are effective to minimize ghost-images of all kinds, such as, CRT symbology, "sun balls", instrument panel lighting, etc.

Likewise, the thickness of optical visor 100 is determined not by reflectivity or transmissivity considerations, but by the impact protection requirements of the wearer.

See-through distortion correction of optical visor 100 is preferably accomplished by forming the outer surface 110 of optical visor 100 into a shape that is substantially a replica of the inner surface 114 of optical visor 100 as described above.

In addition to discovering the improved visor construction described above, applicants have developed a highly effective method of constructing visors with substantially cofocal inner and outer surfaces in accordance with the improved visor construction described above.

The preferred method for fabricating a visor for mounting on a helmet adapted to be worn by an individual, includes the steps of first establishing an orthogonal coordinate system of spatial reference having its origin located on an inner concave surface of the desired visor and its z-axis parallel to the line of sight of the individual intended to be wearing the helmet. Next, one must generate a solution set of values for the multi-variable function defined by the following system with respect to the orthogonal coordinate system of spatial reference previously established:

$$z(x,y) = \begin{cases} [(r_1)^2 - (x)^2]^{\frac{1}{2}} - (r_1) \\ \dfrac{-(x - a_1)^2}{4(b_1)} - c_1 \\ \dfrac{-(+b_2x + e_1) + [(+b_2x + e_1)^2 - 4(c_3)(a_3x^2 + dx + f)]^{\frac{1}{2}}}{2(c_2)} \\ [(r_2)^2 - (y)^2]^{\frac{1}{2}} - (r_2) \\ [(r_3)^2 - (y)^2]^{\frac{1}{2}} - (r_3) \\ \dfrac{(y - a_3)^2}{4(b_3)} + c_3 \end{cases}$$

$$o \leq |x| \leq 11.720329103, y = \text{constant}$$
$$11.720329103 \leq |x| \leq 56.928795878$$
$$y = \text{constant}$$
$$|x| \geq 56.928795878$$
$$y = \text{constant}$$
$$y \geq 44.920846709, x = \text{constant}$$
$$-27.58643266 \leq y \leq 44.920846709$$
$$x = \text{constant}$$
$$y \leq -27.58643266, x = \text{constant}$$

Once the above series of equations has been solved for the particular solution set desired for a chosen set of variables, the solution set of values is preferably stored in a form and a medium adapted for use in a numerically controlled manufacturing system.

It is now preferable to use a numerically controlled manufacturing system apparatus controlled by the stored solution set of values to form a sheet of material to conform on at least one of its surfaces to a spatial representation of the solution set of values with respect to the orthogonal coordinate system of spatial reference.

More specifically, the numerically controlled manufacturing system can be utilized to produce a mold useful in injection molding. Injection molding includes forming a generally flat acrylic or polycarbonate plastic sheet into the visor by such known processes as heat forming and vacuum forming of the sheet in the mold.

The invention described above is, of course, susceptible to many variations, modifications and changes, all of which are within the skill of the art and it is to be understood that all such variations, modifications and changes are within the spirit and scope of the invention and of the appended claims. Similarly, it will be understood that it is intended to cover all changes, modifications and variations of the example of the invention herein disclosed for the purpose of illustration which do not constitute departures from the spirit and scope of the invention.

We claim:

1. A headgear mounted display comprising in combination:
   headgear adapted to be worn by a person;
   means for projecting an image;
   a visor formed from substantially transparent plastic material for mounting on said headgear and having an inner concave and an outer convex surface, and, with reference to an orthogonal, right-handed xyz Cartesian coordinate system of spatial reference having its origin located on said inner concave surface and its z-axis parallel to the line of sight of the person wearing said headgear, said inner concave surface being in cross-section in the x-axis of reference, symmetrical about both the origin and the y-z plane of reference, having one-half of the cross-section of said visor in the x-axis of reference as a first circular segment containing the origin at one end and connected at its opposite end to one end of a first paraboloid segment which is connected at its opposite end to one end of an elliptic segment whose opposite end forms a side boundary of said visor,
   and having a cross-section of the visor in the y-axis of reference having a second circular segment, one end of which forms an upper boundary of said visor and an opposite end connected to one end of a third circular segment having its opposite end connected to one end of a second paraboloid segment whose opposite end forms a lower boundary of said visor.

2. A headgear mounted display in accordance with claim 1 wherein the outer surface of said plastic material forms a convex surface having a shape that is substantially a replica of said inner concave surface.

3. A headgear mounted display in accordance with claim 2 wherein said inner concave surface of said visor has a narrow band reflective coating deposited thereon having about 30 percent reflectivity at the wavelength of said image projecting means, and a broad band anti-reflection coating deposited on its outer convex surface.

4. A headgear mounted display in accordance with claim 1 further including a sun visor mounted on said headgear adapted to be added or removed from covering said visor.

5. A headgear mounted display in accordance with claim 4 wherein said sun visor has a broad band anti-reflection coating deposited on its inner and outer surfaces.

6. A headgear mounted display in accordance with claim 5 wherein said sun visor is constructed of a material having a transmissivity factor of about 15 percent to ambient light.

7. A head gear mounted display in accordance with claim 1 wherein said image projecting means is a cathode ray tube.

8. A visor for mounting on a helmet adapted to be worn by an individual, comprising:
   a sheet of substantially transparent plastic shield material having an inner concave surface, and, with reference to an orthogonal, right-handed xyz Cartesian coordinate system of spatial reference having its origin located on said inner concave surface and its z-axis parallel to the line of sight of the individual wearing the helmet, said inner concave surface being defined by a cross-section of said sheet in the x-axis of reference, which is symmetrical about both the origin and the y-z plane of reference, having one-half of the cross-section of said sheet in the x-axis of reference being a first circular segment containing the origin at one end and connected at its opposite end to one end of a first paraboloid segment which is connected at its opposite end to one end of an elliptic segment whose opposite end forms a side boundary of said sheet, and by a cross-section of said sheet in the y-axis of reference having a second circular segment, one end of which forms an upper boundary of said sheet and an opposite end connected to one end of a third circular segment having its opposite end connected to one end of a second paraboloid segment whose opposite end forms a lower boundary of said sheet.

9. A visor in accordance with claim 8 wherein the thickness of said sheet of plastic shield material is in the range of 0.050 to 0.150 inches, and said inner surface has a reflectivity of 3 to 5 percent.

10. A headgear mounted display comprising in combination:
headgear adapted to be worn by a person;
means for projecting an image;
a visor formed from substantially transparent plastic material for mounting on said headgear and having an inner concave and an outer convex surface, and, with reference to an orthogonal, right-handed xyz Cartesian coordinate system of spatial reference having its origin located on said inner concave surface and its z-axis parallel to the line of sight of the person wearing said headgear, said inner concave surface being in cross-section in the x-axis of reference, symmetrical about both the origin and the y–z plane of reference, having one-half of the cross-section of said visor in the x-axis of reference as a first concave segment containing the origin at one end and connected at its opposite end to one end of a first paraboloid segment which is connected at its opposite end to one end of a second concave segment whose opposite end forms a side boundary of said visor, and having a cross-section of said visor in the y-axis of reference having a third concave segment, one end of which forms an upper boundary of said visor and an opposite end connected to one end of a fourth concave segment having its opposite end connected to one end of a second paraboloid segment whose opposite end forms a lower boundary of said visor.

11. A headgear mounted display in accordance with claim 10 wherein the outer surface of said plastic material forms a convex surface having a shape that is substantially a replica of said inner concave surface.

12. A headgear mounted display in accordance with claim 11 wherein said inner concave surface of said visor has a narrow band reflective coating deposited thereon having about 30 percent reflectivity at the wavelength of said image projecting means, and a broad band anti-reflection coating deposited on its outer convex surface.

13. A headgear mounted display in accordance with claim 10 further including a sun visor mounted on said headgear adapted to be added or removed from covering said visor.

14. A headgear mounted display in accordance with claim 13 wherein said sun visor has a broad band anti-reflection coating deposited on its inner and outer surfaces.

15. A headgear mounted display in accordance with claim 14 wherein said sun visor is constructed of a material having a transmissivity factor of about 15 percent to ambient light.

16. A headgear mounted display in accordance with claim 10 wherein said image projecting means is a cathode ray tube.

17. A visor for mounting on a helmet adapted to be worn by an individual, comprising:
a sheet of substantially transparent plastic shield material having an inner concave surface, and, with reference to an orthogonal, right-handed xyz Cartesian coordinate system of spatial reference having its origin located on said inner concave surface and its z-axis parallel to the line of sight of the individual wearing the helmet, said inner concave surface being defined by a cross-section of said sheet in the x-axis of reference, which is symmetrical about both the origin and the y-z plane of reference, having one-half of the cross-section of said sheet in the x-axis of reference being a first concave segment containing the origin at one end and connected at its opposite end to one end of a first paraboloid segment which is connected at its opposite end to one end of a second concave segment whose opposite end forms a side boundary of said sheet, and by a cross-section of said sheet in the y-axis of reference having a third concave segment, one end of which forms an upper boundary of said sheet and an opposite end connected to one end of a fourth concave segment having its opposite end connected to one end of a second paraboloid segment whose opposite end forms a lower boundary of said sheet.

18. A visor in accordance with claim 17 wherein the thickness of said sheet of plastic shield material is in the range of 0.050 to 0.150 inches, and said inner surface has a reflectivity of 3 to 5 percent.

19. A visor for mounting on a helmet adapted to be worn by a wearer, comprising:
a sheet of substantially transparent plastic shield material having an inner concave and an outer convex surface, said inner concave surface defining, in those two regions of said inner concave surface adapted to be positioned immediately in front of the eyes of the wearer of the helmet, respective first and second paraboloids, said two paraboloids having spaced axes.

20. A visor in accordance with claim 19 wherein said two regions of said inner concave surface merge into an intermediate region which is generally circular in horizontal section.

21. A visor in accordance with claim 20 wherein said two regions respectively merge into first and second side regions, on opposite sides of the visor, which are generally elliptical in horizontal cross-section.

22. A visor in accordance with claim 21 wherein said two regions are each located at the lower edge of the visor.

23. A visor in accordance with claim 19 wherein said two regions respectively merge into first and second upper regions, above said two regions, which are generally circular in vertical cross-section.

24. A visor in accordance with claim 23 wherein said two regions respectively merge into first and second upper regions, above said two regions, which are generally parabolic in horizontal cross-section.

25. A visor in accordance with claim 19 wherein said outer convex surface of the visor has a shape that is substantially a replica of said inner concave surface.

26. A visor in accordance with claim 25 wherein said inner concave surface of the visor has a narrow band reflective coating deposited thereon having about 30 percent reflectivity at an imaging wavelength, and a broad band anti-reflection coating deposited on said outer convex surface.

27. A visor in accordance with claim 26 wherein the thickness of said sheet of shield material lies substantially within the range of 1.3 to 3.8 mm (0.05 to 0.15 inches), the inner concave surface of the visor having a reflectivity lying substantially within the range of 3 to 5 percent.

28. A head-up display combining the visor of claim 19 with:
headgear adapted to be worn by a person;
image projecting means adapted to project an image onto said two regions.

29. A head-up display as claimed in claim 28 further including a sun visor mounted on the headgear and arranged to selectively cover the visor.

30. A head-up display as claimed in claim 29 wherein said sun visor has a broad band anti-reflection coating deposited on its inner and outer surfaces.

31. A head-up display as claimed in claim 29 wherein said sun visor is constructed of material having a transmissivity of substantially 15 percent to ambient light.

32. A head-up display as claimed in claim 28 wherein said image projecting means is a cathode ray tube.

* * * * *